United States Patent [19]
Honda

[11] Patent Number: 5,826,266
[45] Date of Patent: Oct. 20, 1998

[54] CYBERSPACE SYSTEM FOR ACCESSING VIRTUAL REALITY OBJECTS

[75] Inventor: Yasuaki Honda, Chiba, Japan

[73] Assignee: Sony Corporation, Tokyo, Japan

[21] Appl. No.: 552,065

[22] Filed: Nov. 2, 1995

[30] Foreign Application Priority Data

Nov. 8, 1994 [JP] Japan .................................. 6-273293

[51] Int. Cl.$^6$ .................................................. G06F 17/30
[52] U.S. Cl. ..................................................... 707/9
[58] Field of Search .................................. 395/609, 186, 395/187.01, 491; 707/9

[56] References Cited

U.S. PATENT DOCUMENTS

| | | | |
|---|---|---|---|
| 4,928,222 | 5/1990 | Vriezen et al. | 395/673 |
| 4,956,769 | 9/1990 | Smith | 395/609 |
| 5,224,212 | 6/1993 | Rosenthal et al. | 395/250 |
| 5,276,901 | 1/1994 | Howell et al. | 395/800 |
| 5,446,903 | 8/1995 | Abraham et al. | 395/728 |
| 5,488,362 | 1/1996 | Ullman et al. | 341/20 |
| 5,495,521 | 2/1996 | Rangachar | 379/95 |
| 5,497,479 | 3/1996 | Hornbuckle | 395/491 |
| 5,539,906 | 7/1996 | Abraham et al. | 305/609 |
| 5,544,321 | 8/1996 | Theimer et al. | 395/200.11 |
| 5,555,376 | 9/1996 | Theimer et al. | 395/200.09 |
| 5,613,089 | 3/1997 | Hornbuckle | 395/491 |
| 5,634,122 | 5/1997 | Loucks et al. | 395/608 |
| 5,638,513 | 6/1997 | Ananda | 395/188.01 |

*Primary Examiner*—Paul R. Lintz
*Attorney, Agent, or Firm*—Limbach & Limbach L.L.P.

[57] ABSTRACT

According to the cyberspace system of the present invention, a virtual reality space to be supplied to a user's terminals is constructed by information objects for supplying information and user objects for accessing the information objects to receive the information, and each of the information object allows an access of each of the user objects when F(Si, Su) is true: Si represents a status of the information object, Su represents a status of the user object and F represents a function for determining allowance or disallowance of the access to the information object.

20 Claims, 9 Drawing Sheets

ACCESS CONTROL USING HISTORY

CYBERSPACE SYSTEM FOR ACCESSING VIRTUAL REALITY OBJECTS

BACKGROUND OF THE INVENTION

1. Field of the Invention

The present invention relates to a cyberspace system which is suitably used to produce a virtual reality space and provide various information to users' terminals.

2. Description of the Related Art

An information supply system in which user's access is carried out from a user's terminal to a center to obtain various kinds of information is realized by using a so-called personal computer or the like.

In such a system, when a user's terminal accesses desired information, it is necessary for the accessed side to judge whether it should allow the access. The following two methods have been known as conventional techniques of controlling such an access.

One method is realized in a file system of UNIX (Trade Name). In this method, allowance or disallowance of the access can be set for every file to be accessed and every content to be accessed, such as calling, alteration, execution or the like.

That is, as shown in FIG. 1, files A to C containing prescribed data are formed, and a file access condition list for specifying conditions for these files is also prepared. Some (three in this case) access conditions are specified for each file in the file access condition list. In this case, three access conditions of condition 1 to condition 3 are specified. For example, the access condition for file A is to satisfy condition 1, the access condition for file B is to satisfy conditions 1 and 2, and the access condition for file C is to satisfy conditions 1 to 3.

FIG. 2 shows the processing of user access in such a file system. In step S1 the name of a file to be accessed is first inputted, and then in step S2 the content of the access, such as calling, alteration, execution or the like for the file is inputted.

Subsequently, the process goes to a next step S3 to read out an access condition for the file input in step S1 from the file access condition list. Thereafter, in step S4 the content of the access input in step S2 is compared with the access condition, which is written in the list and read out in step S3. If it is judged on the basis of the comparison result that the condition is satisfied, the process goes to a step S5 to execute a file access processing. On the other hand, if the condition is judged not to be satisfied, the process goes to a step S6 to execute an error processing. That is, access to the file is disallowed.

The other access control method is to issue a ticket from the access side in advance. Any user who has a ticket can access the issuer of the ticket in an access range which is specified in the ticket.

In the first method (UNIX method), the access is allowed or disallowed in accordance with an attribute of an access side, and the condition thereof must be recorded beforehand in the list for managing all the files. Therefore, there is a problem in that it is difficult to increase the types of attributes for the judgment and to set special attributes to only prescribed files.

For example, when the types of attributes serve as a base for the judgement on the allowance of access, it is necessary to re-specify the conditions on the allowance of access for all of the existing files. The re-specification of the conditions becomes substantially impossible as the number of files increases. Furthermore, the setting of a desired access attribute for a desired file means that the attribute is not set as an access attribute for another file. Therefore, in this case, it is also substantially impossible as the number of files increases.

Furthermore, in the second method using a ticket, the information used to judge whether the access is allowed or not is determined at the time when the ticket is issued. Therefore, it is impossible to disallow the access to an accessed side in response to an event which occurs at the accessed side after the ticket has been issued. In addition, when the ticket is assigned to another person, it is also impossible to disallow the access by the person to whom the ticket is assigned.

SUMMARY OF THE INVENTION

The present invention has been implemented in view of the foregoing situation, and its object is to achieve a system which is capable of increasing the types of attributes and setting special conditions, and which is further capable of disallowing access in accordance with a momentarily varying situation.

A cyberspace system for supplying a virtual reality space from a server (for example, a server 3 in FIG. 3) to a user's terminals (for example, user' terminals 1-1 to 1-4 in FIG. 3) is characterized such that the virtual reality space is constructed by information objects which supply information (information objects A1, A2 of FIG. 3, for example) and user objects which access the information objects to receive the information (for example, user objects UO1-1 to UO1-4 of FIG. 3). Each of the information objects allows access for each of the user objects when $F(Si, Su)$ is true, where $Si$ represents a status of the information object, $Su$ represents a status of the user object and $F$ represents a function for determining allowance or disallowance of the access to the information object.

The status $Su$ of the user object may be set to at least one access history to the information object by the user object, for example of the corresponding user's terminal, the age, sex, occupation, address and the grade of a credit card owned by the user object, a term or duration of use of the cyberspace, and the presence or absence of desired information.

The status $Si$ of the information object may be set to at least one of the types of information to be supplied from the information object and its term of validity.

The cyberspace system is constructed by the objects in which various attributes are specified, and access is allowed in accordance with the status of at least one of the information objects for supplying information and the status of the user objects for receiving information. Accordingly, increasing the types of the attributes and setting special conditions can be easily performed. In addition, the disallowance of access can be determined in accordance with a momentarily-varying situation.

DETAILED DESCRIPTION OF THE PREFERRED EMBODIMENT

Figure 1:
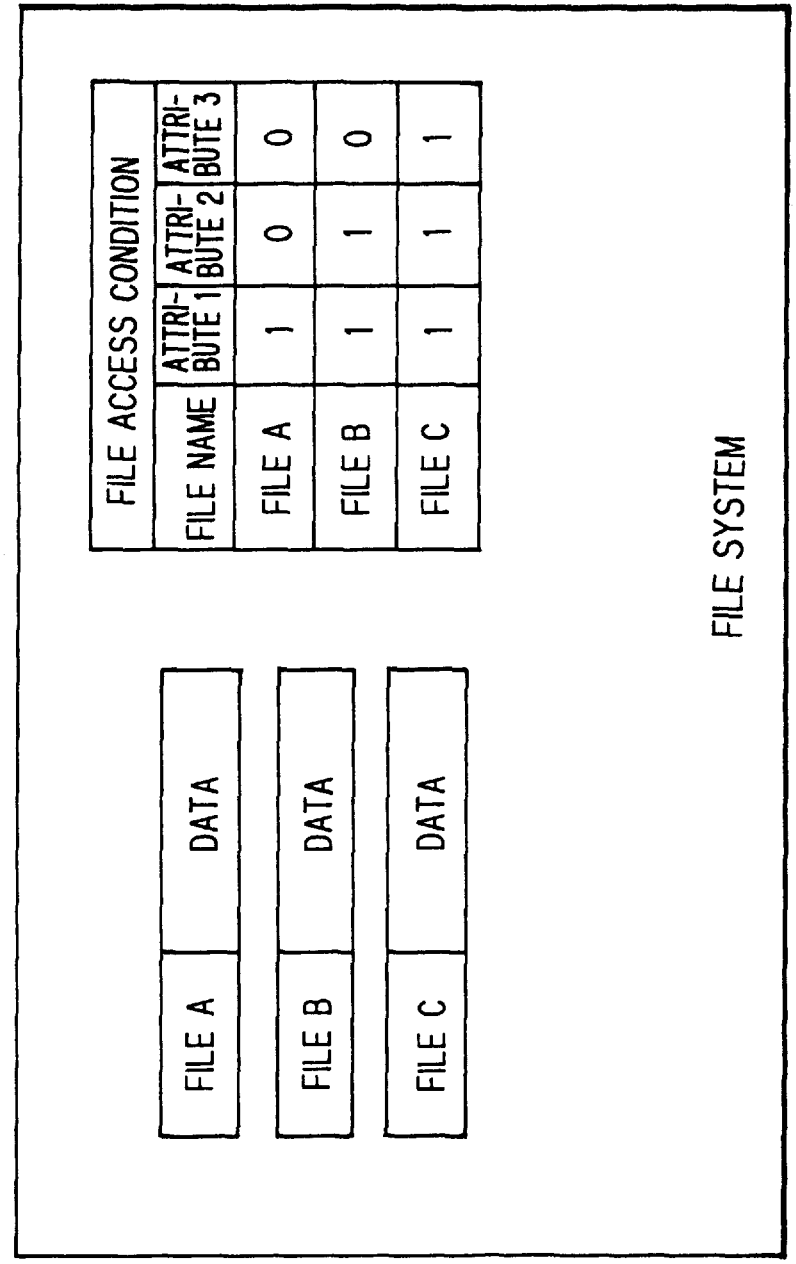
FIG. 1 is a diagram showing a conventional file system of the prior art.
Figure 2:
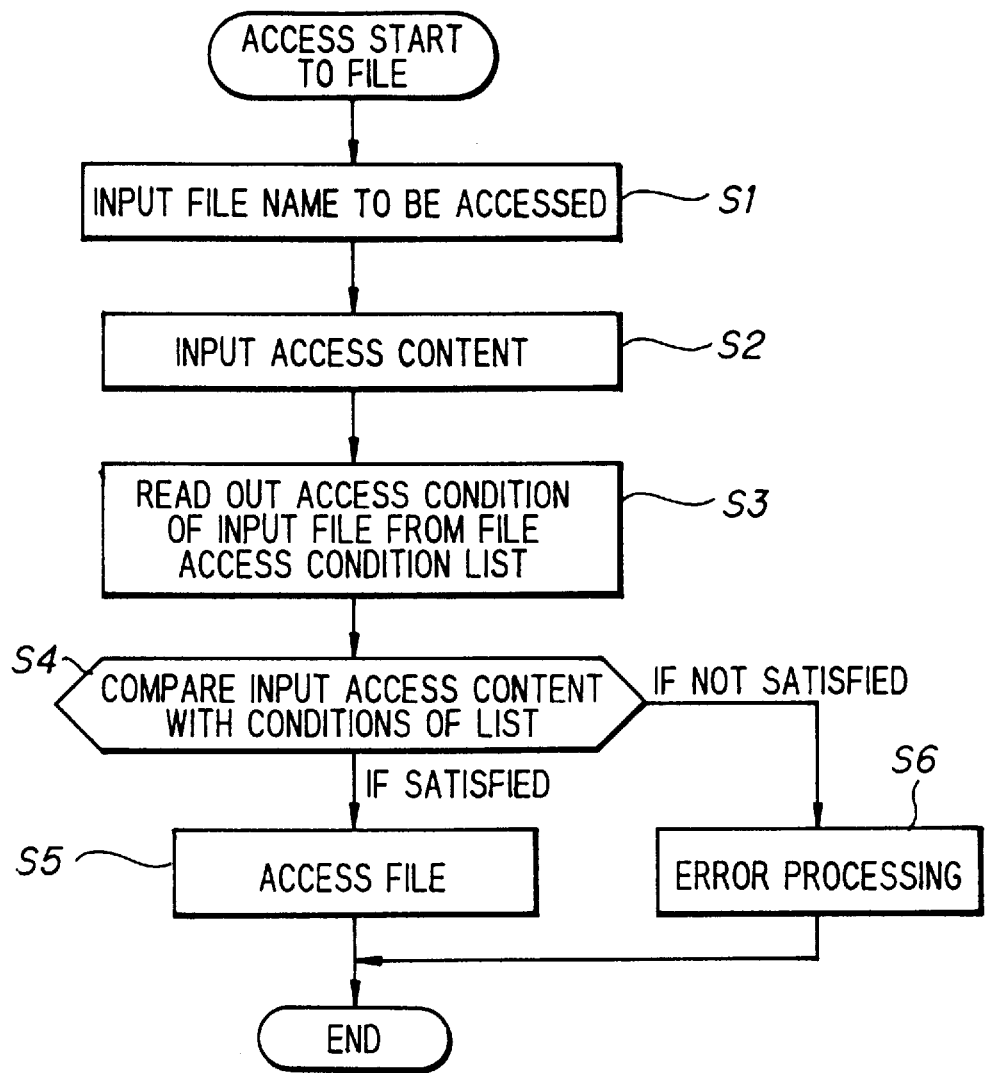
FIG. 2 is a flowchart for the processing of a user access in the prior art file system of FIG. 1.
Figure 3:
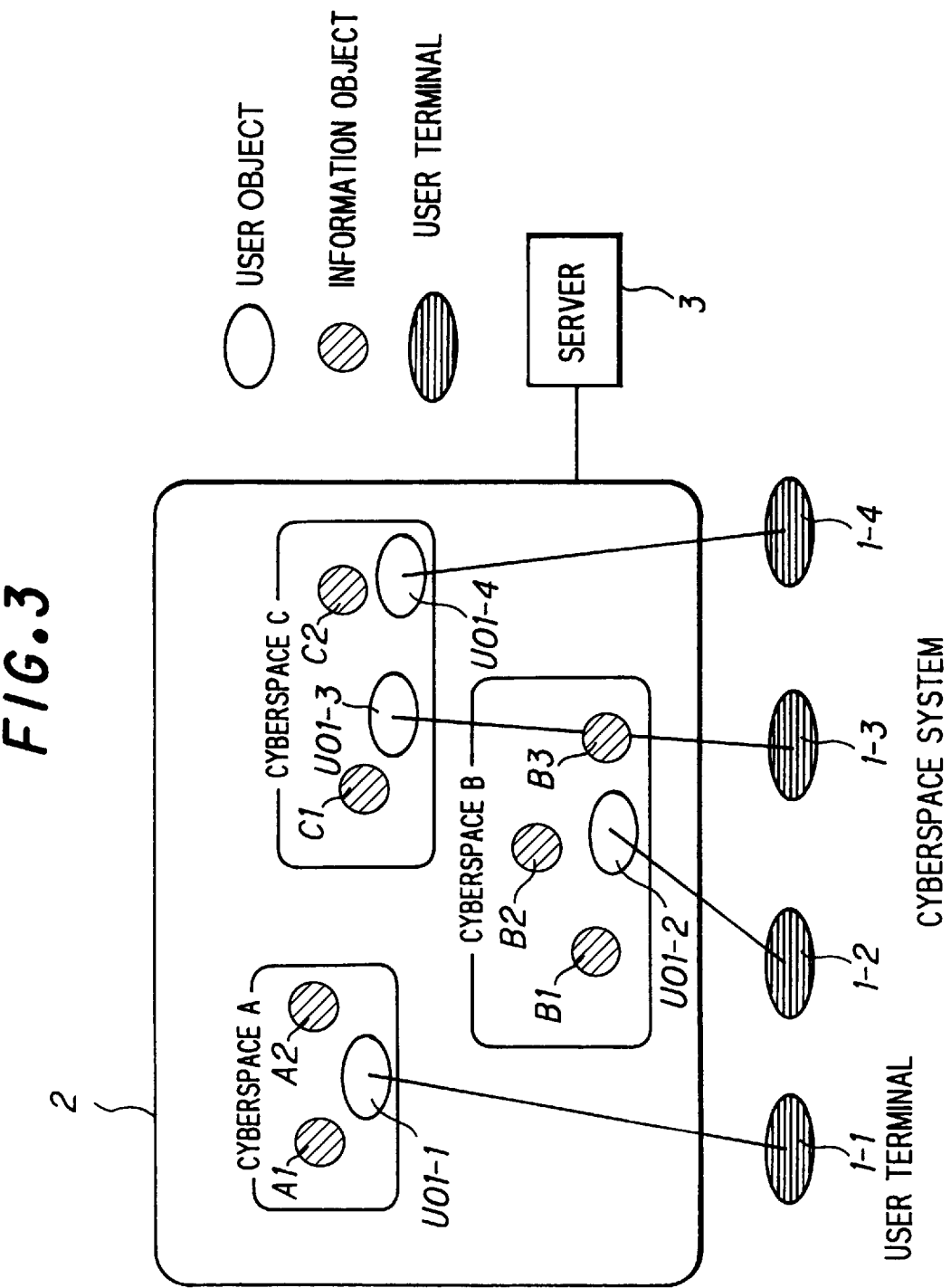
FIG. 3 is a diagram showing the whole structure of a cyberspace system of the present invention.

FIG. 3 shows the construction of a cyberspace system. The cyberspace system as shown in FIG. 3 includes a server 3 for supplying a virtual reality space 2, and users' terminals 1-1 to 1-4 which are connected to the server 3 through a high-speed communication network using an optical fiber or the like and which receive the virtual reality space 2. The virtual reality space 2 is provided with one or more (in this embodiment, three) cyberspaces (cyberspaces A, B, C). These cyberspaces A, B, C are systems for supplying services such as media information on moving pictures, still images, sound, music, texts, network games using the media information, on-line shopping, data base searching, etc.

The information (service) supplied from the cyberspace is classified every relating information, and stored in the server 3. Respective user must prepare their user terminals 1-1 to 1-4 and also must register themselves as users to use the virtual reality space 2. In a user registration, the server 3 prepares user objects UO1-1 to UO1-4 corresponding to the user's terminals 1-1 to 1-4.

The respective users operate the corresponding user objects UO1-1 to 1-4 with the user's terminals 1-1 to 1-4. Each user can access a cyberspace having his desired information to check information stored in the cyberspace, play games, shop, etc. The information (service) which can be supplied from each cyberspace is different in accordance with each cyberspace.

Figure 4:
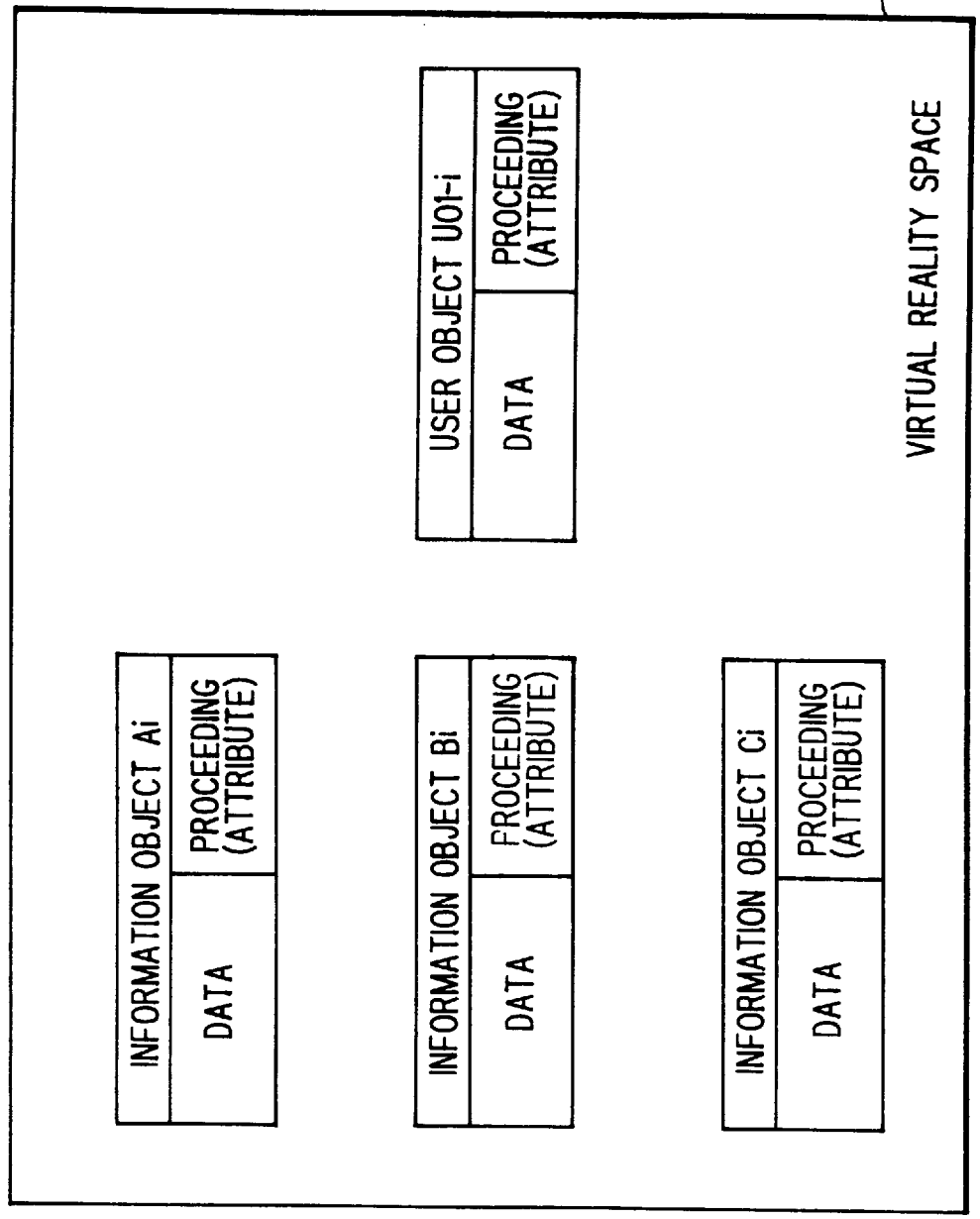
FIG. 4 is a diagram showing objects constructing a virtual reality space 2 of FIG. 3.

The virtual reality space 2 is constructed as an object system as shown in FIG. 4. That is, all of the cyberspaces A, B, C, various information objects A1, A2, B1 to B3, C1, and C2 which construct the cyberspaces A, B, C, etc., the user objects UO1-1 to UO1-4 which are operated through the user terminals 1-1 to 1-4 by users, are constructed as objects which are specified according to data and proceedings. Accordingly, each user can access a desired cyberspace (cyberspaces A, B, C) by operating his user object UO1-i to receive information which is managed by the cyberspace.

The user object UO1-i corresponds to each user terminal 1-i, and it serves as a special object representing a user himself. The user object UO1-i holds, as attributes in the proceeding, information on various charges, information histories representing what objects in what cyberspaces were accessed in the past, personal information such as the age of a user himself, his occupation, etc.

The user object UO1-i is designed to be operated by the user terminal 1-i, so that operation content from the user terminal 1-i (for example, an operation of a button (not shown) provided to the user terminal 1-i, an input of voice or the like) can be transmitted as a message to another user object according to a specific proceeding. Furthermore, image data can be received as a message, Output to the corresponding user terminal to display the image data or an access on information held by a user object can be received as a message.

Furthermore, the user object UO1-i corresponds to each user terminal 1-i, and thus its content is fixed in the virtual reality space 2. Accordingly, irrespective of such a situation that the user object UO1-i corresponding to the user terminal 1-i receives information of the cyberspace B or it receives information of the cyberspace A, alteration of the content of the user object UO1-i owing to the difference of a reception target is not carried out.

The access to the various information objects A1, A2, B1 to B3, C1 and C2 in the virtual reality space 2 is performed as the transmission of a message to the information object. For example, in order for the user object UO1-i to check the content of a desired information object, the user object UO1-i transmits a message to the information object and then receives a response therefrom The type of the message which the information object can receive is varied for each cyberspace. If the information object is an information object of a cyberspace for shopping, the information object can receive a message on prices or an explanation of articles. If the information object is an information object on a battle game, it can receive a message of an attack instruction.

Furthermore, the content of a service to be supplied from each cyberspace may be varied in accordance with the user's attribute. For example, the service may be set such that a user is allowed to receive only video information if he pays a small amount of money as an entrance fee to a cyberspace, while the user can receive not only video information, but also audio information if he pays a large amount of money as an entrance fee. In this case, a user interface is also varied in accordance with the money the user pays.

That is, the virtual reality space 2 is entirely constructed by the objects, and each object has substantially an attribute which is set according to its proceeding. The information object of each cyberspace determines allowance or disallowance of the access in accordance with the attribute.

Figure 5:
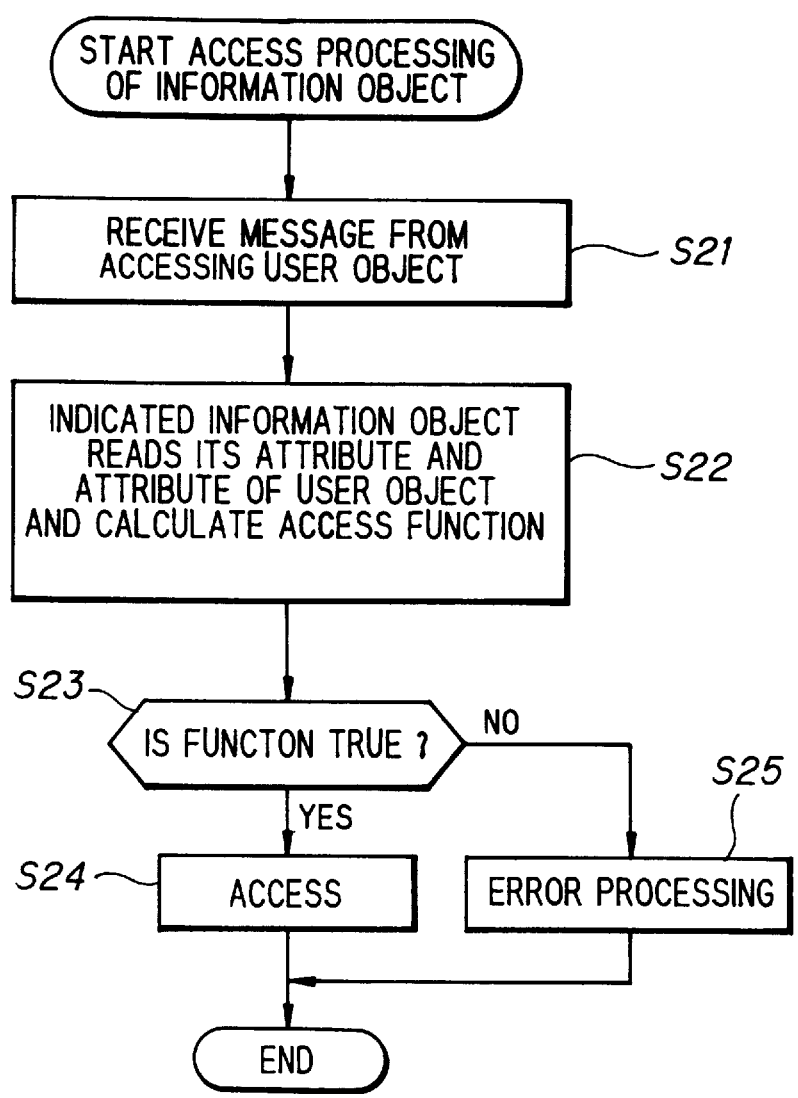
FIG. 5 illustrates an access processing which is executed by each information object.

FIG. 5 shows an the processing of a user access which is executed by each information object. First, in step S21, a message for an access is received from an accessing user object UO1-i. Subsequently, the process goes to a step S22, where an information object which receives the message reads its own attribute and the attribute of the user object UO1-1 transmitting the message according to a proceeding which is set for the information object itself, and calculates an access function.

That is, representing the status corresponding to the attribute of the user object UO1-i by Sa, the status corresponding to the attribute of the information object by Sb and a function for determining allowance or disallowance of the access to the information object by F, F(Sa, Sb) is calculated.

Next, the process goes to a step S23 to judge whether the function F(Sa, Sb) calculated in the step S22 is true or not. If it is true, the process goes to a step S24 to execute an access processing (allow the access). If it is not true, the process goes to a step S25 to execute an error processing (disallow the access).

Figure 6:
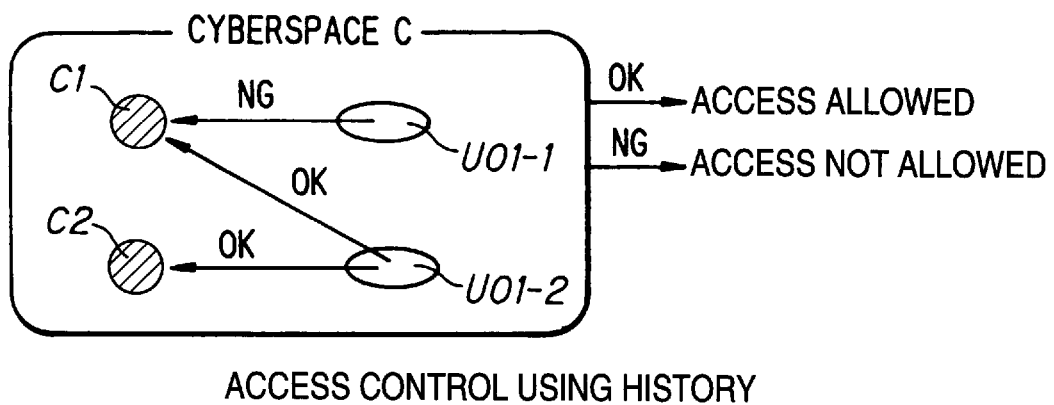
FIG. 6 is a chart for the processing of a user access based on an access history.

FIG. 6 shows an embodiment in which the access is allowed or disallowed in accordance with a past access history of the user object UO1-i. That is, in this embodiment, the proceeding of the information object C2 which constitutes the cyberspace C is set so that the access to the information object C2 is allowed for any user object, whereas the proceeding of the information object C1 is set so that the access is allowed for only user objects which have once accessed the information object C2.

Accordingly, in the embodiment shown in FIG. 6, the user object UO1-l accesses the information object C1 although it has not yet accessed the information object C2, so that the access of the user object UO1-1 to the information object C1 is disallowed.

On the other hand, the user object UO1-2 has an experience of accessing the information object C2, so that access to the information object C1 is allowed.

It is set as an attribute in the proceeding of each user object to store an access history thereof, and the information object Ci determines allowance or disallowance of the access in accordance with the attribute of the user object UO1-i.

Describing this with a general expression, representing the status corresponding to the access history of the user object UO1-i by Sa and representing an access judgment function of the information object Ci by F. the information object Ci allows the access only when the F(Sa) is true. That is, in this case, the status Sb of the information object Ci is a substantially invalid condition (a condition which all user objects satisfy).

Figure 7:
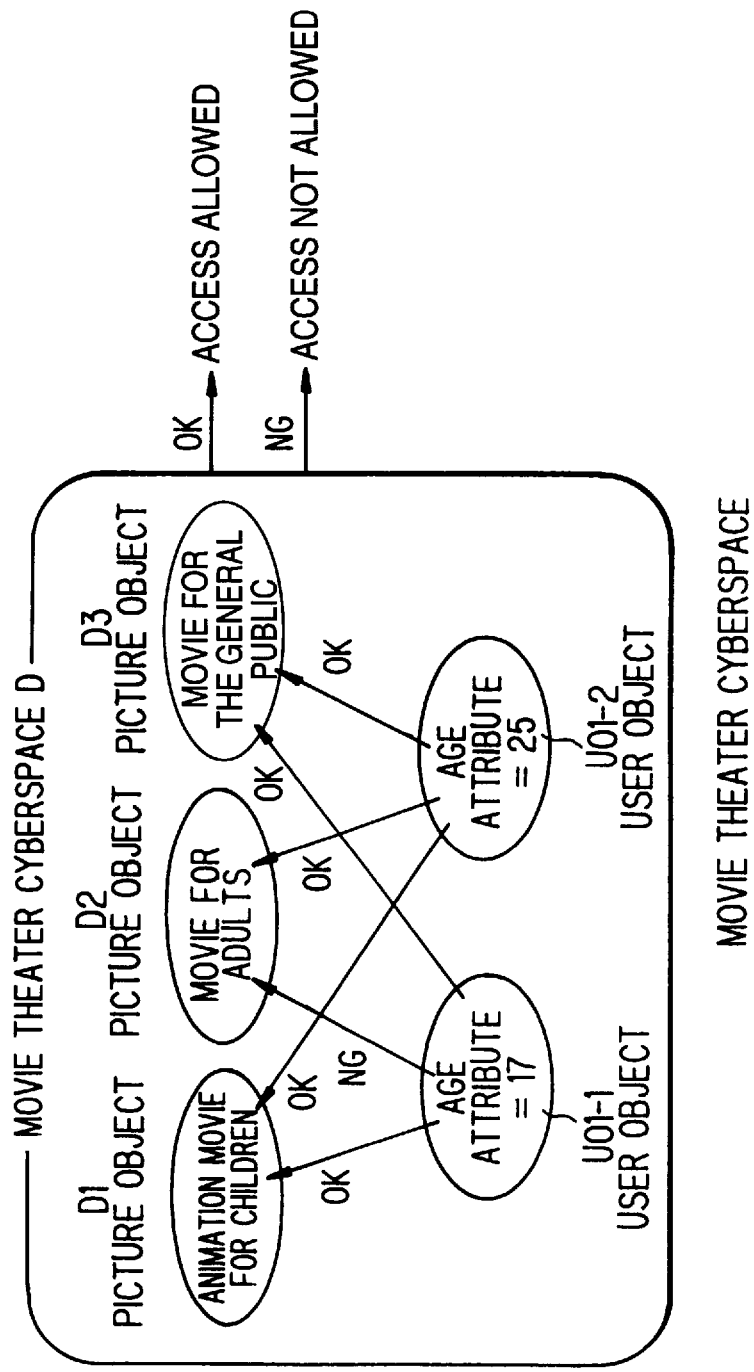
FIG. 7 is a diagram showing an access control based on an age attribute.

FIG. 7 shows the construction of a cyberspace for movie theaters. A movie-theater cyberspace D comprises movie objects D1 to D3. A movie object D1 supplies animation movies for children, a movie object D2 supplies movies for adults and a movie object D3 supplies movies for the general public. Accordingly, in this embodiment, both the movie objects D1 and D3 allow access from all user objects; however, the movie object D2 determines allowance or disallowance of access by checking the age attribute in the attributes of an accessing information object to judge whether the age attribute shows 18 years old or older because the movies supplied from the movie object D2 are for adults.

For example, when the age attributes of the user object UO1-1 and the user object UO1-2 are 17 years old and 25 years old respectively, the movie object D2 allows the access from the user object UO1-2 to supply movies for adults to the user object UO1-2, however, it disallows the access from the user object UO1-1. Accordingly, no movies for adults are supplied from the movie object D2 to the user object UO1-1.

In this embodiment, representing the status of the user object (the age attribute in this embodiment) by Sa, the movie object D2 allows the access therefrom when F(Sa) is true (above 18 years old).

Figure 8:
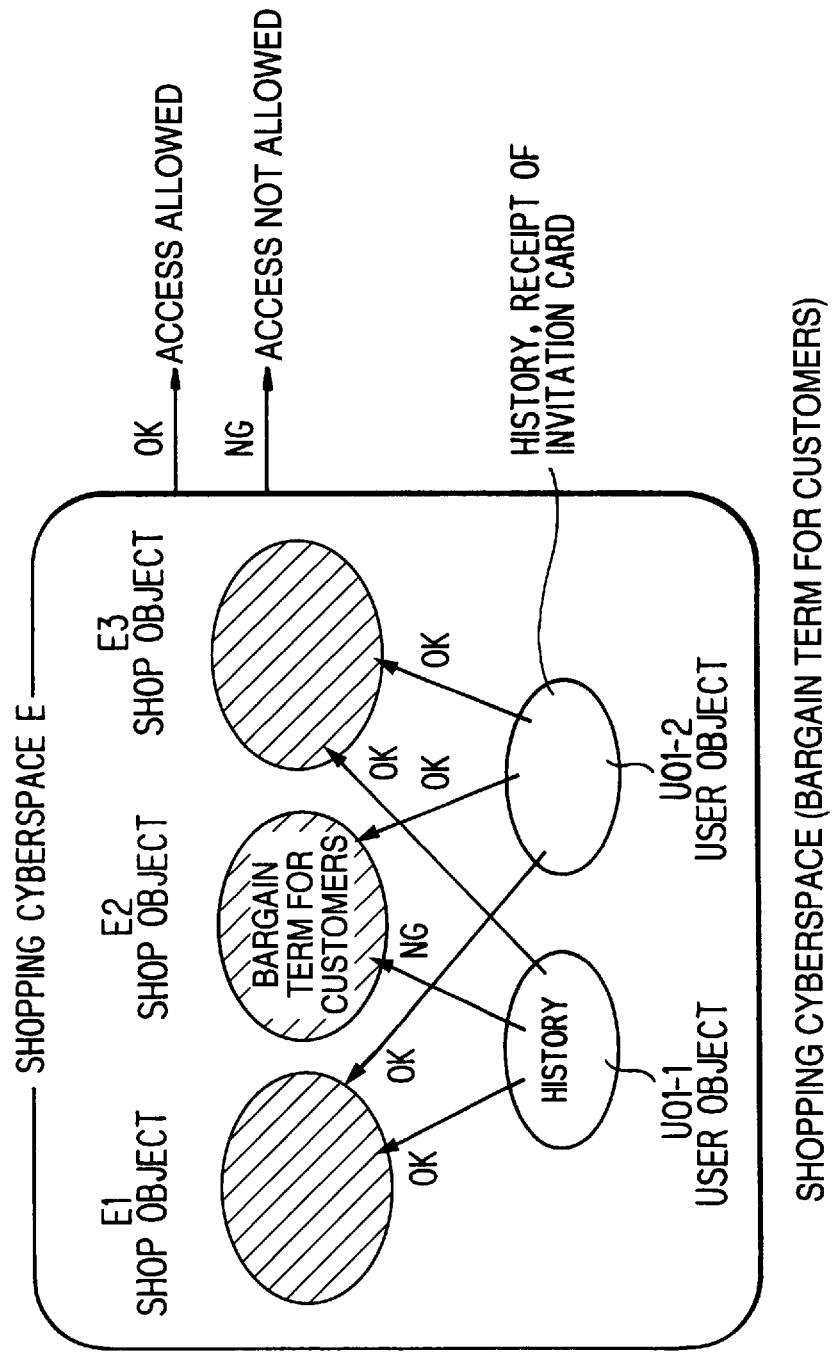
FIG. 8 is a diagram showing an access control based on attributes of the presence or absence of an invitation card and a bargain term.

FIG. 8 shows another embodiment. In this embodiment, a shopping cyberspace E comprises shop objects E1 to E3. The shop objects E1 and E3 do not set any special condition for access. Accordingly, these shop objects allow the access from all the user objects.

For example, the shop object E2 opens a bargain sale for customers for a term from August 1 with August 15, and beforehand sends an invitation card to each predetermined user. The invitation card is sent to the user of the user object UO1-2; however, it is not sent to the user of the user object UO1-1. The shop object E2 holds a list of users to whom the invitation cards were sent.

When an access from each user object is carried out, the shop object E2 judges whether the user object exists in the list. If the user object is judged to exist in the list, the shop object E2 allows the access. On the other hand, if the user object is judged not to exist in the list, the shop object E2 disallows the access. Accordingly, in this case, the access of the user object UO1-2 is allowed and the access of the user object UO1-1 is disallowed.

In this case, the proceeding of the shop object E2 is set so that access is allowed when the user object is a user object to whom an invitation card was sent and it is now under a bargain sale term for customers. That is, in this case, the access is allowed if it is true that an accessing user object is a user object having an invitation card, and also it is true that an access time is within the bargain sale term.

Figure 9:
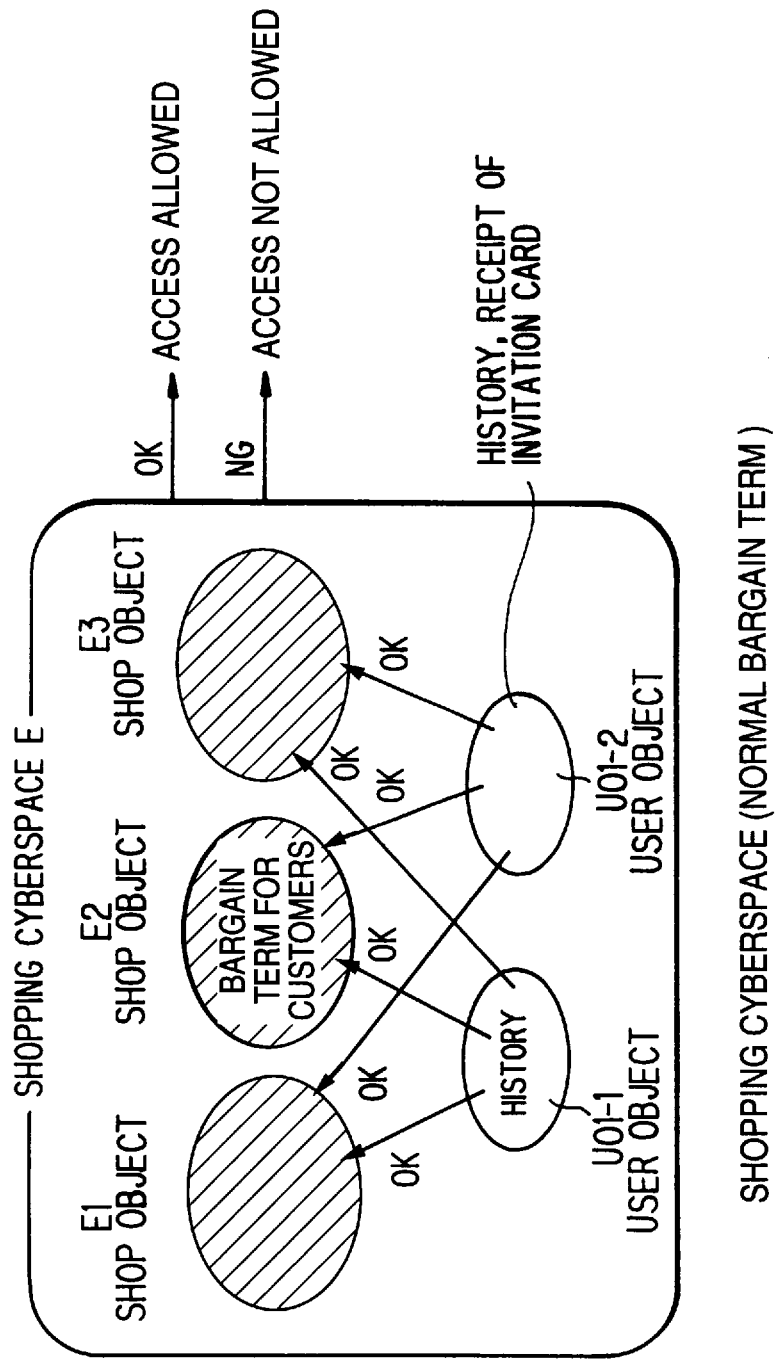
FIG. 9 is a diagram showing an access control based on a term or duration attribute.

On the other hand, after the bargain term for customers from August 1 to August 15 is finished, it is changed to a normal bargain term as shown in FIG. 9. In this case, the shop object E2 allows the access from not only user objects to whom invitation cards were sent, but also user objects to whom no invitation card was sent.

Accordingly, after the bargain term for customers is finished, the proceeding of the shop object E2 is set so that the shop object E2 allows access from all the user objects when access within the normal bargain term is true.

That is, in this case, representing the status of the user object (whether it has an invitation card) by Sa and representing the status that the shop object E2 is within the bargain term for customers by Sb, during the bargain term for customers, the proceeding of the shop object E2 is set so that access is allowed only when F(Sa, Sb) is true. On the other hand, representing the status such that the shop object E2 is within a normal bargain term, during the this term, the proceeding is set so that the access is allowed when F(Sb) is true.

The status of the user object may be set to its access history to an information object, the type of the corresponding user's terminal, the age, sex, occupation, address and the grade of an owned credit card of the user object, a term or duration of use of a cyberspace, or the presence or absence of desired information. Furthermore, the status of the information object may be set to the type of information supplied from the information object, the term of validity of information supplied from the information object, or the like.

In this embodiment, an overhead is set to zero for an object for which no limitation is imposed on access thereof. Furthermore, with respect to objects for which an access limitation is required, a flexible access condition with respect to an object which is about to access and variation of the status of itself may be set. In addition, an access-limiting condition may be set for each information object. Only both an object at that side and the status of an object at this side are required as information to check access limitation, so that a time required for the check is constant even when the number of objects of a cyberspace increases.

As described above, according to the cyberspace system of the present invention, the virtual reality space is constructed by the user objects and the information objects, and the access is allowed or disallowed in accordance with the status of each information object or user object. Therefore, it can be easily performed to increase the types of attributes and to individually set the access condition therefor. Furthermore, an access condition which varies momentarily can be freely set.

What is claimed is:

1. A cyberspace system server for supplying a virtual reality space from said server to users' terminals, characterized in that the virtual reality space is constructed by information objects which supply information and user objects which access the information objects to receive the information, and each of said information objects allows or disallows an access of each of said user objects when F(Si, Su) is true, where Si represents a status of said information object, Su represents a status of said user object and F represents a function for determining allowance or disallowance of the access to said information object.

2. The cyberspace system server as claimed in claim 1, wherein the status Su of said user object is at least one of an access history to said information object by said user object, the type of the corresponding user's personal data, a usage term of a cyberspace, or presence or absence of desired information.

3. The cyberspace system server as claimed in claim 2, wherein the type of the corresponding user's personal data is at least one of the terminal, the age, sex, occupation, address or the grade of an owned credit card of said user object.

4. The cyberspace system server as claimed in claim 1, wherein the status Si of said information object is at least one of the type or term of validity of information to be supplied from said information object.

5. A cyberspace information network including one or more servers coupled to one or more clients, the server operable to store and control access to information by the clients, the information network comprising:

one or more information objects which represent information in a virtual reality space and include associated information and one or more status attributes; and one or more user objects which represent users in the virtual reality space and include one or more status attributes and which are operable to access the information objects to receive the associated information, wherein each of the information objects allows an access of the associated information by each of the user objects within the virtual reality space when F(Si, Su) is true, and wherein Si represents the status attributes of the information object, Su represents the status attributes of the user object, and F represents a function for determining whether a particular user object is permitted to access each of the information objects within the virtual reality space.

6. The apparatus of claim 5, wherein the status attributes represented by the Su of a particular user object includes an access history of the information objects by the particular user object.

7. The apparatus of claim 5, wherein the status attributes represented by the Su of a particular user object includes a characteristic of a corresponding user's personal data.

8. The apparatus of claim 7, wherein the characteristic of a corresponding user's personal data includes a client type of the user object.

9. The apparatus of claim 7, wherein the characteristic of a corresponding user's personal data includes an age of the user object.

10. The apparatus of claim 7, wherein the characteristic of a corresponding user's personal data includes a sex of the user object.

11. The apparatus of claim 7, wherein the characteristic of a corresponding user's personal data includes an occupation of the user object.

12. The apparatus of claim 7, wherein the characteristic of a corresponding user's personal data includes an address of the user object.

13. The apparatus of claim 7, wherein the characteristic of a corresponding user's personal data includes a grade of an owned credit card of the user object.

14. The apparatus of claim 5, wherein the status attributes represented by the Su of a particular user object includes an allowed usage duration of a cyberspace.

15. The apparatus of claim 5, wherein the status attributes represented by the Su of a particular user object includes an indication of the presence of desired information.

16. The apparatus of claim 5, wherein the status attributes represented by the Si of a particular information object includes a type of information to be supplied by the information object.

17. The apparatus of claim 5, wherein the status attributes represented by the Si of a particular information object includes a term of validity of information to be supplied by the information object.

18. The apparatus of claim 5, wherein the clients include user terminals, the user objects are associated with a particular user terminal, and the user objects and the information objects exist on the server.

19. A cyberspace information access control method comprising the steps of:

assigning one or more status attributes to one or more information objects within a virtual reality space, wherein the information objects include associated information;

assigning one or more status attributes to one or more user objects within the virtual reality space, wherein the user objects are operable to access the information objects within the virtual reality space to receive the associated information of the information objects;

computing the value of F(Si, Su) where Si represents the status attributes of the information objects, Su represents the status attributes of the user objects, and F represents a function for determining whether a particular user object is permitted to access a particular information object within the virtual reality space;

allowing the user objects access to the associated information of the information objects if the computed value of F(Si, Su) is true for the particular information object and the particular user object within the virtual reality space; and disallowing the user objects access to the associated information of the information objects if the computed value of F(Si, Su) is not true for the particular information object and the particular user object within the virtual reality space.

20. The method of claim 19, further comprising the steps of:

accessing the associated information of the information objects by the user objects if the user objects access is allowed; and returning an error message if the user objects access is disallowed.

* * * * *